United States Patent [19]

Harwell et al.

[11] Patent Number: 4,745,976
[45] Date of Patent: May 24, 1988

[54] METHOD FOR SELECTIVELY PLUGGING THE MORE PERMEABLE REGIONS OF AN UNDERGROUND FORMATION HAVING NON-UNIFORM PERMEABILITY

[75] Inventors: Jeffrey H. Harwell; John F. Scamehorn, both of Norman, Okla.

[73] Assignee: Board of Regents for the University of Oklahoma, Norman, Okla.

[21] Appl. No.: 908,634

[22] Filed: Sep. 18, 1986

[51] Int. Cl.⁴ .................. E21B 43/22; E21B 33/138
[52] U.S. Cl. ................................. 166/273; 166/294
[58] Field of Search ............... 166/270, 273, 274, 294

[56] References Cited

U.S. PATENT DOCUMENTS

| | | | |
|---|---|---|---|
| 2,747,670 | 5/1956 | King et al. | 166/270 |
| 3,396,790 | 8/1968 | Eaton | 166/270 |
| 3,949,811 | 4/1976 | Threlkeld et al. | 166/270 X |
| 4,031,958 | 6/1977 | Sandiford et al. | 166/270 |
| 4,159,037 | 6/1979 | Varnon et al. | 166/294 X |
| 4,160,480 | 7/1979 | Schievelbein et al. | 166/294 X |
| 4,161,982 | 7/1979 | Schievelbein et al. | 166/294 X |
| 4,184,549 | 1/1980 | Schievelbein | 166/273 X |
| 4,213,500 | 7/1980 | Cardenas | 166/273 |
| 4,296,811 | 10/1981 | Morris et al. | 166/273 |

Primary Examiner—George A. Suchfield
Attorney, Agent, or Firm—Dunlap, Codding & Peterson

[57] ABSTRACT

A method for selectively plugging the more permeable regions of an underground formation having non-uniform permeability wherein a first surfactant solution is injected into the formation in an amount effective to contact a substantial portion of the surface area of the highly permeable regions of the formation, which first surfactant solution is characterized as having a selected chromatographic velocity and as being capable of reversibly adsorbing onto the surface of the pores of the formation.

After injecting the first surfactant solution, a water-soluble spacer fluid is injected in an amount sufficient to place the first surfactant solution a selected distant into the formation, the spacer fluid being characterized as having a pre-injection viscosity about equal to the first surfactant solution.

After injecting the space fluid, a second surfactant solution is injected in an amount about equal to the amount of the first surfactant solution, and characterized as having a pre-injection viscosity about equal to the first surfactant solution and the spacer fluid, and as having a selected chromatographic velocity which is higher than the chromatographic velocity of the first surfactant solution, and has having a composition such that it will be capable of interacting physically with the first surfactant solution to produce a phase change so that the product of such interaction is capable of at least partially plugging the pores of the formation in which such product is placed.

1 Claim, 3 Drawing Sheets

METHOD FOR SELECTIVELY PLUGGING THE MORE PERMEABLE REGIONS OF AN UNDERGROUND FORMATION HAVING NON-UNIFORM PERMEABILITY

FIELD OF THE INVENTION

The present invention relates to methods for selectively plugging the more permeable regions of an underground formation having non-uniform permeability.

BACKGROUND OF THE INVENTION

Primary recovery generally results in an average recovery of only 25% of the oil originally in an oil bearing formation. Secondary recovery, water flooding, generally recovers another 10% by the time it becomes uneconomical to continue. It is not unusual, then, for 60% to 70% of the oil originally in the formation to remain when it becomes uneconomical to keep the field open.

Two major factors contribute to trapping this unrecovered oil in the formation. One of these is the capillary forces which arise because of the high oil/water interfacial tension. This problem is addressed by techniques such as $CO_2$, $N_2$, alkaline or surfactant flooding. The other major factor is the heterogeneity of the reservoir. There are always areas of the reservoir that are more permeable to the reservoir fluids than the rest of the reservoir. As the flow of fluids always occur through the areas of least resistance to flow, injected fluids tend to flow through the high permeability areas, bypassing the oil in the lower permeability areas. This problem is not directly addressed in $CO_2$, $N_2$ or chemical flooding. There are three basic procedures by which this phenomenon can be combated. One is to reduce the viscosity (resistance to flow) of all the fluids in the reservoir, for example by in situ combustion or steam flooding. Another is to increase the viscosity of the drive fluids, for example by polymer flooding. A third method is to partially or completely block off the high permeability areas of the reservoir. In situ combustion is difficult to control and maintain, and usually requires continuous $O_2$ or air injection. It is only economical with heavy crudes. Using a high viscosity drive fluid has the major disadvantages of reducing flow rates, which is deleterious to the economics of a project, and of loosing large volumes of solution through the high permeability areas which have already been depleted of oil. Additionally, polymers tend to degrade in the reservoir because of the temperature, because of microbial actions and because of the shearing of the long polymer chains as the polymer solution is forced through the rock pores.

Two methods of partially or completely blocking the high permeability regions of the reservoir are currently being studied. One of these is the use of foams. Foams, however, are proving difficult to form in situ, and are not equilibrium structures; hence, they may degrade too quickly. Another promising procedures is to inject pulses of polymer solutions in a formation, interspersed with high concentrations of multivalent ions. In situ mixing then results in formation of a highly viscous gel. In addition to the drawbacks of polymer floods this technology has the additional drawback of requiring control of gelation time to delay gelation until the polymer solution is away from the well bore and into the high permeability regions of the reservoir before gelation occurs.

BRIEF DESCRIPTION OF THE DRAWINGS

FIG. 4 is a graphic representation of the results of certain experiments plotting cumulative pore volume injected versus flow rate.

DESCRIPTION OF THE PREFERRED EMBODIMENTS

Figures 1A, 1B, 2A:
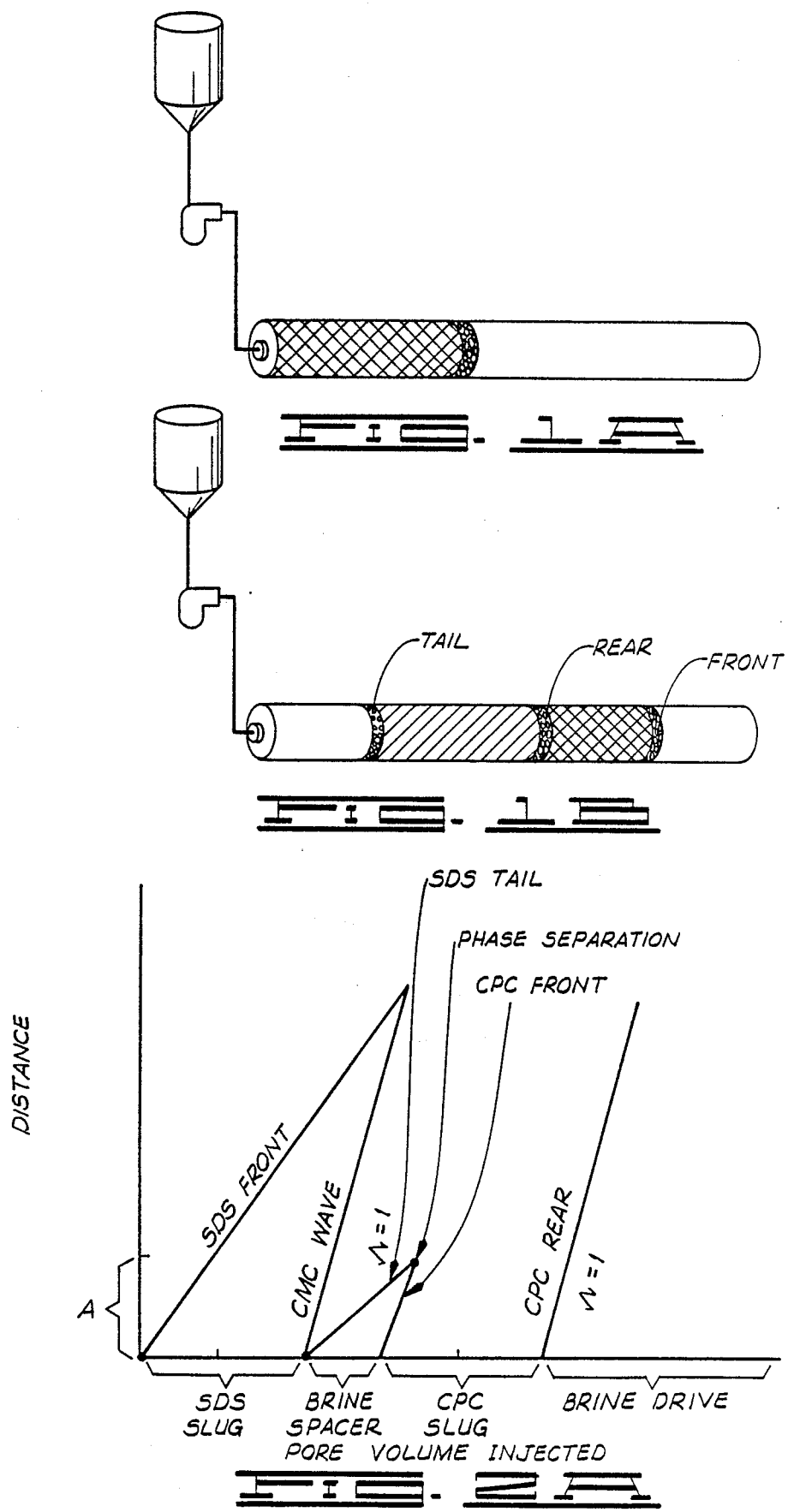
FIG. 1A is a schematic representation of surfactant being injected into a core.
FIG. 1B is a schematic representation of surfactant being injected into a core and then injecting brine behind the surfactant.
FIG. 2A is a graphic representation of the trajectories of the waves generated by the injection of a second surfactant slug and shows the interaction of two dilute surfactant slugs separated by a variable volume brine spacer.

The present invention is a new method for partially or completely blocking the high permeability regions of the reservoir. The technique depends upon the ability to induce phase changes in surfactant solutions by changing counterions or by adding small quantities of different surfactants. For example, an aqueous solution of anionic surfactant may have a viscosity little different from brine; but an increase in the salt concentration or addition of a multivalent counterion can cause the surfactant to form a solid precipitate or form a gel-like structure of high viscosity. Because these are new phase, they are, unlike foams, equilibrium structures. The same behavior may be produced by mixing anionic surfactants with, for example, cationic or nonionic surfactants.

One of the most unique features of the present invention is that mixing may be easily accomplished in situ by use of the tendency of the different surfactant types and various electrolytes to travel at different velocities through the reservoir because they interact differently with the reservoir minerals. As one possible example, consider the sequential injection of a cationic surfactant, a fresh water slug, and then an anionic surfactant. As most reservoir minerals have a negatively charged surface at natural pH, cationic (positively charged) surfactants will tend to move slowly through the reservoir, spending much of the their time on the surface of the reservoir minerals. The fresh water injected behind the cationic surfactant solution allows the surfactant to move away from the well bore and into the high permeability areas of the reservoir without undergoing a phase change. When the anionic (negatively charged) surfactant is then injected, because it is repelled by the mineral surface, it will spend relatively little time on the minerals, giving it a higher effective velocity through the reservoir. When the anionic surfactant overtakes the cationic surfactant, a phase change will occur, resulting in formation of precipitate, constricting or blocking the rock pores in the high permeability areas.

A variation of the present invention is the injection of an ionic surfactant followed by a pulse of a multivalent counterion (e.g., sodium alkylbenzenesulfonate followed by a calcium solution). This will form a precipitate in the high permeability regions of the reservoir where the ionic surfactant had been flowing, plugging these regions. This would then force flow through the low permeability regions of the reservoir.

Another example is the injection of a nonionic surfactant solution, followed by a high salinity stream. This would cause the nonionic surfactant solution to be above its cloud point, at which time, it would form a very viscous coacervate phase which would plug the highly permeable portions of the reservoir through which the solution was flowing.

Depending on surfactant concentrations, concentration ratios, counterion concentrations, counterion types, reservoir temperatures, and injection strategies, a nearly endless variety of possible combinations can be envisioned to make the technique applicable to wide ranges of reservoirs.

There are several potentialy major advantages to this new method over other selective permeability reduction techniques studied to date. With the new process proposed here it is possible to control the distance from the injection point at which plugging occurs; that is, the mixing process is delayed until the surfactant solutions are an arbitrary distance away from the well bore and deep into the high permeability areas. The distance from the injection point at which plugging occurs can be controlled mainly because of the different chromatographic velocities at which surfactants travel through the reservoir. Another advantage is that, since formation of precipitate or coacervate is not instantaneous, a relatively thick zone of precipitate or coacervate can form before formation blockage prevents further interpenetration of the two solutions.

Though making use of surfactants, the new process is not to be confused with classical (low tension) surfactant flooding, which is designed to enhance oil recovery by reducing oil/water interfacial tension. The new process introduced here improves oil recovery not by improving microscopic displacment efficiency, but rather by improving the volumetric sweep efficiency of any secondary or tertiary process by selectively blocking off the high permeability regions of a reservoir. Since phase separation can occur with only ppm concentrations of surfactant, the large up-front cost of classical surfactant flooding is potentially avoidable, and injectivities should remain high during the process. Because of the expected greater tolerance for variation in process parameters, the engineering needed for a surfactant enhanced volumetric sweep efficiency process is also potentially much less than a low tension surfactant flood.

As already mentioned, the new process we are proposing here depends on two physical phenomena: (1) The chromatographic movement of dilute surfactant solution and (2) the occurrence of spontaneous phase separations from dilute surfactant solutions with the addition of a small amount of another appropriately selected surfactant.

When a concentration change of an adsorbing component in a dilute solution is propagated through a porous medium, the velocity of the concentration change will be less than the velocity of the carrier fluid. For example, when an aqueous surfactant solution is injected into a sand pack, some of the surfactant molecules will adsorb out of the solution and onto the minerals of the sand pack. Any particular individual surfactant molecule will spend part of its time on the immobile solid surface and part of its time in the mobile bulk solution. When it is in the mobile phase, the surfactant molecule is carried along at the velocity of the mobile phase, but when it is on the solid surface it is immobile and has a velocity of zero. This gives each molecule of surfactant, and thereby the change in surfactant concentration itself, an effective velocity which is less than that of the velocity of the mobile phase. The greater the equilibrium adsorption of the surfactant species from the solution, the greater the fraction of its total time in the sand pack each surfactant molecule will spend on the immobile solid surface and the lower the effective velocity of the surfactant concentration change relative to the velocity of the mobile phase. If, for example, an aqueous slug of surfactant is injected into a sand pack, and the surfactant adsorbs on the minerals of the sand pack, then the velocity of the surfactant slug will be less than the bulk fluid velocity, even though the surfactant is contained completely within the aqueous phase and the surface of the solid with which the aqueous phase is in contact. If we change the structure of the surfactant molecule so that it spends less time on the solid surface and more time in the moving fluid phase, i.e. if we reduce its equilibrium adsorption from the solution, then a slug of that surfactant will have a greater chromatographic velocity. Conversely, if we change its structure so that is spends more time immobile on the solid surface and less time in the moving aqueous phase, i.e. if we increase its equilibrium adsorption, then we will reduce its chromatographic velocity.

This phenomenon is represented schematically in FIG. 1 below. As shown in FIG. 1A, a dilute solution of surfactant is injected into a sand pack (or core), with the assumption that the mobile aqueous phase is in local equilibrium with the solid phase (the distribution of surfactant molecules between the solution and the surface is the same as if they were in a test tube together). The front of the surfactant slug will be sharp, the concentration of surfactant behind the slug front will be the same as the injected concentration, and the velocity of the slug front is given by a simple mass balance across the slug front:

In this expression $V_{front}$ is the velocity of the front of the surfactant slug, $V_{bulk}$ fluid is the velocity of the bulk fluid (or, equivalently, of a non-adsorbing tracer), $C_{inj}$ is the concentration of the surfactant in the slug as it is being injected, and if the solution contains micelles, then $\Gamma_{cmc}$ is the adsorption onto the mineral from a solution of the surfactant at a concentration above its Critical Micelle Concentration (CMC) in units of moles per unit volume of the porous medium. Note from this equation that as the adsorption at the injected concentration is increased, the velocity of the slug front is decreased. As schematically shown in FIG. 1B, when we begin to inject brine behind the surfactant slug, if the concentration of the surfactant in the slug is above the surfactant's CMC, so that the solution contains micelles, then two new "concentration waves", i.e. propagationally stable variations in surfactant concentration, begin to move through the sand pack. The wave labled "REAR" in FIG. 1B is a concentration wave of variation between the injected composition downstream and a region of surfactant at its CMC upstream. The velocity of this wave is the same as the velocity of the bulk fluid, since it is just a variation of micelle concentration at constant monomer concentration and constant surfactant adsorption. Wave "REAR" will then be a sharp concentration variation; i.e., it will occur over a narrow fraction of the sand packs total length. The wave labeled "TAIL" in FIG. 1B is a wave of concentration variation between the region at the surfactant's CMC and a region containing only brine with no surfactant at all. Depending on the shape of the surfactant's adsorption isotherm, wave "TAIL" may or may not be a sharp variation in concentration. Its velocity can be approximated by the following expression.

(All the variables in equation 3 are defined analogously to those in equation 2.) After brine has been injected behind the surfactant slug for some period of time, there will be a growing region near the injection point that has no surfactant in it, either on the solid surface or in the bulk solution. If a second surfactant slug is then injected into the same sand pack, the velocity with which its front will propagate into the sand pack will also be given by equation (2). If we want the second surfactant slug to overtake the first one, then we just must make sure that (1) the velocity of the front of the second slug is greater than the velocity of the tail of the first slug, and that (2) we do not give the first slug too great a head start. Equations (2) and (3) show us the variables which can be manipulated to obtain this situation: CMCs, plateau adsorptions (i.e. the adsorption above the CMC, which will be approximately constant for a monoisomeric surfactant), slug volumes, and brine spacer volume.

It is possible, then, to inject a slug of a surfactant into an adsorbing medium, follow it by injected brine—free of surfactant—for some almost arbitrary period of time, then inject a surfactant with a greater chromatographic velocity and have the second surfactant slug overtake the first, slower moving slug inside the porous medium. It is important to note that the in situ mixing of the two slugs does not require the mixing of two difference fluid phases within the porous medium, as both surfactants are with the same aqueous phase; rather, this "mixing" actually consists of the interpenetration of two concentration waves within a single phase. It can be pictured as the molecules of the second surfactant, which by design spend less time on the surface of the solid phase than those of the second surfactant, catching up with and then "leap frogging" the molecules of the first surfactant within the same moving aqueous phase. There should be no concern, then, about any inability of the process to achieve in situ mixing of fluids of different viscosities or different densities, as this is not what takes place. It is actually more accurate to think of the interaction of the two sufactant slugs not as a mixing process, but rather as the interference of two waves moving within the same medium.

If the two surfactants in the two different slugs have been chosen so that on mixing they will undergo a phase change, then on the interpenetration of the front of the fast slug with the tail of the slow slug, an equilibrium surfactant phase can be made to separate from the solution in situ. If the surfactant phase which separates from the solution is capable of blocking the pore throats within the porous medium, then the flow path which the slugs have followed will become sealed off to any subsequently injected fluids. Two surfactant phases which suggest themselves as possibly useful for blocking the region in which this slug interpenetration occurs are the solid precipitate phase and the viscous, gel-like coacervate phase which surfactants are known to form.

The same combination of two surfactant species can in general form either of these two potentially interesting phases, depending upon their concentrations in the region where mixing occurs. Since the phases formed are in thermodynamic equilibrium with the solutions from which they are separated, they can be expected to be stable over periods of time long relative to the time of an enhanced recovery process. In dilute solutions surfactant phase separations also occur very slowly, taking periods of up to several weeks to occur under laboratory conditions. If achieved in situ, this phenomenon would allow deep interpenetration of the slugs before the flow path of the fluid was changed by plug formation, so that the plugs themselves, once fully formed, could fill significant portions of the flow paths.

A unique aspect of this surfactant enhanced volumetric sweep efficiency process is that the distance from the injection point at which the front of the fast surfactant slug overtakes the tail of the slow surfactant slug can be either very large or very small, depending on the relative velocities of the two concentration waves which first interact and the size of the brine "spacer" injected between the two surfactant slugs. This can be illustrated more clearly by the use of distance/time diagram. In FIG. 2A, the trajectories of the waves generated by the injection of the second surfactant slug are illustrated.

In order to make the illustration more concrete, we will assume that the surfactants being used are the anionic surfactant sodium dodecylsulfate (SDS) and the cationic surfactant cetyl pyridinium chloride (CPC), and that the sand pack consists of a bed of alumina powder. While SDS is unsuitable for reservoir applications because of the susceptibility of sulfates to hydrolysis at reservoir temperatures, and while CPC probably has too high a molecular weight to be propagated a suitable distance away from the well bore in a reasonable length of time, these two compounds are commercially available in monoisomeric form and exhibit behavior analogous to that which would be required of compounds suitable for an actual reservoir treatment.

In FIG. 2A, the ordinate is the distance a concentration wave has traveled from the injection point, and the abscissa is the total number of pore volumes of the continuous mobile phase which have been injected since the beginning of the injection of the first surfactant slug. Note that along the abscissa the volumes of the SDS slug, the brine spacer, and the CPC slug are indicated. Because the alumina in the sand pack has a positive surface charge, the anionic surfactant will have the lowest chromatographic velocity in this system, and so should be injected first. The CPC, having the same charge as the mineral surface, and so being repelled by the surface, will have the higher velocity, and so should be the surfactant of the second slug. Starting from the vertical axis of the plot, the first trajectory is, then, the trajectory of the front of the SDS slug, the second is that of the slug rear (which travels at the bulk fluid velocity and so has a chromatographic velocity of 1.0), and the third is that of the tail of the SDS slug. During the injection of the brine spacer, all of these waves propagate away from the injection point. When the CPC slug is injected, the front of the CPC slug moves at very nearly the bulk fluid velocity, since the CPC has a very low adsorption on alulmina. When the front of the CPC slug overtakes the tail of the SDS slug, either a solid percipitate phase or a viscous coacervate phase will separate from the mobile aqueous phase, plugging the sand pack. The distance above the abscissa at which the SDS tail and the CPC front interact is the distance from the injection point at which plugging first occurs, and is indicated on the distance/time diagram by the distance A.

Figure 2B:
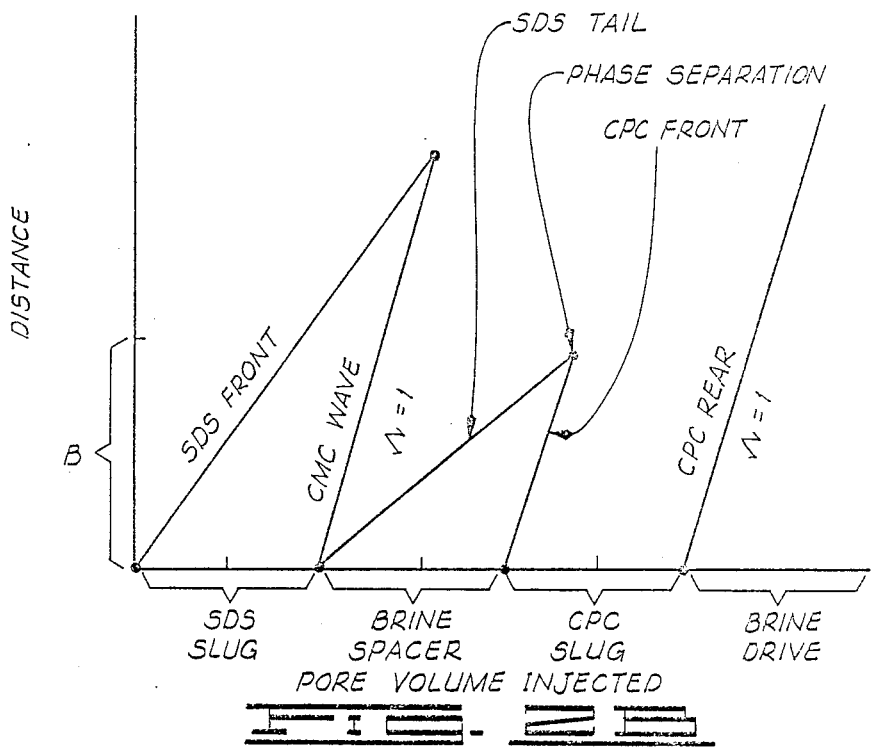
FIG. 2B is similar to FIG. 2A, but the size of the brine spacer has been increased.

In FIG. 2B, the same injection sequence is represented, but now the size of the brine space has been increased. Now the SDS tail is further from the injection point when CPC injection begins, and the distance from the injection point at which the phase separation begins to occur will be greater, as indicated by the relative size of the lengths A and B indicated in FIGS. 2A and 2B.

No one even cursorily aquainted with the complexities of real reservoirs and the materials with which such a process would have to be made to work would fail to realize that though the above description is conceptually simple, substantial research will need to be done to establish the feasibility of the process for field testing. Though many aspects of the process will have to be examined before such a test could be designed, some of the first questions which might be asked are whether a dilute surfactant solution could produce enough precipitate or coacervate to plug a core or pack, whether the surfactant slugs would show sufficient preference for the higher permeability regions of a core or pack for plugging to be selective, and whether even a simple system could produce a tertiary recovery of oil under laboratory conditions. Experimental results presented below will address these questions.

Figure 3:
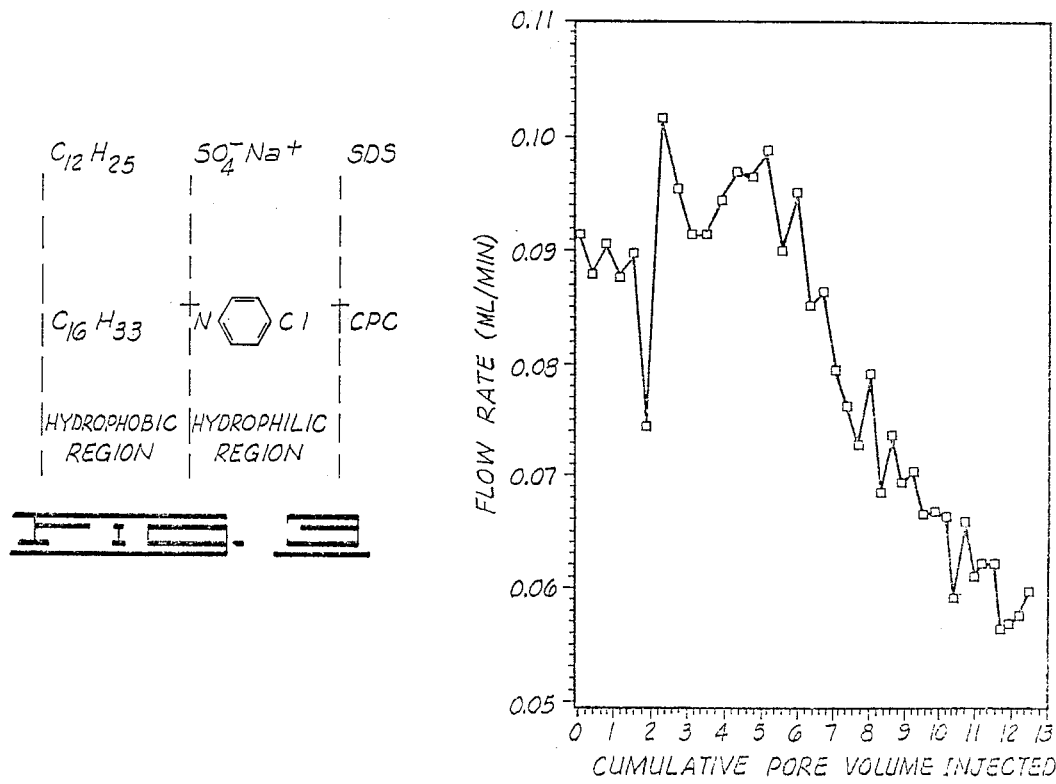
FIG. 3 is a representation of the chemical structure of two surfactants used in certain experiments illustrating the process of the present invention.

Two different surfactants were used in this work. An anionic surfactant, sodium dodecyl sulfate (SDS), and a cationic surfactant, cetyl pyridinium chloride (CPC). The chemical structures of these surfactants are shown in FIG. 3. The SDS was a Kodak Laboratory Chemicals product and was recrystalized from ethanol before use. The CPC, a gift from Hexcel Chemical Products, was food grade and was used as received. The sand packs consisted of standard glass preparative liquid chromatography columns dry-packed with alpha-aluminum oxides obtained from ALFA PRODUCTS. Two aluminas of different particle sized were used to produce packs of different permeabilities. The low surface area ($\approx 3$ m$^2$/g) alumina had particle sizes of 1–15 micron. The high surface area ($\approx 320$ m$^2$/g) alumina had a particle size of 40 microns and was porous.

All solutions contained 0.15 M NaCl. Deionized, distilled water was used to make the brine solution. All surfactant solutions were made by first weighing the surfactant for a certain concentration and then adding the salt solution to bring the solution to the desired concentration; 0.1M HCl was used to adjust the pH of all solutions to pH=4.

Three sets of static measurements were performed on the surfactant solutions: (1) surface tension measurements in order to measure the value of the CMC of the surfactants, (2) phase boundaries in order to find the limits of different regions for the mixed surfactant system used in this study, (3) individual surfactant adsorption isotherms in order to measure the extent of surfactant adsorptions on the mineral oxide. The determination of the CMC was made by standard procedures using a ring tensiometer. For the phase boundary determinations, after the mixtures of SDS and CPC at different concentrations reached equilibrium (after a period of 3 to 4 weeks), they were visually checked for any traces of precipitate or coacervate. The equilibrium concentrations of SDS and CPC in the equilibrated supernatant of the solutions, which of necessity fell on the phase boundaries, were measured by use of high pressure liquid chromatography (HPLC) with a Tracor 951A chromatographic pump and Bausch & Lomb Spectronic 1001 spectrophotometer (at 260 nm wavelength) respectively. A column packed with reverse phase silica gel was used in the HPLC system. By changing the carrier fluid from water to 50/50 water and methanol, SDS was first separated from the NaCl in the system and then flushed from the column into the conductivity cell of the Wescan 201A conductivity detector of the HPLC. The detailed procedure for the use of HPLC and the results of the static experiments are reported elsewhere.

Two series of flow experiments were conducted in oil free systems in the second part of the work: (1) single column runs to show that permeability of a sand pack can be reduced by the mechanism proposed and (2) double column runs in order to show the selectivity of plugging in higher permeability zones. To demonstrate the ability of the process to produce a tertiary recovery of oil from a sand pack, parallel columns, one packed with each of the two aluminas used in the study, were first saturated with n-heptane, then waterflooded to produce a residual oil saturation. Details of the experimental set-up and procedure are available elsewhere. The parameters monitored in the flow experiments were the pressure drop across the bed or beds, flow rate from each column used, and the fluid levels in the feed burets, except for the single column study reported, which was run before pressure monitoring equipment could be attached to the system.

Experimental conditions for the flow equipments are summarized in Table 1. In the single column experiments performed, injection of the dilute solution of the anionic surfactant (SDS), was followed by a brine slug, and then injection of a dilute solution of the cationic surfactant (CPC). In generally, flow rate reductions of 15% to 50% were achieved.

TABLE 1

| EXPERIMENTAL CONDITIONS IN FLOW EXPERIMENT |
|---|
| COLUMN LENGTH (cm) - 15 |
| COLUMN CROSS SECTIONAL AREA (cm$^2$) - 0.0707 |
| COLUMN VOLUME (cm$^3$) - 1.0603 |
| CRITICAL MICELLE CONCENTRATION IN STANDARD BRINE (.15 M NaCl): |
| SDS - 830 $\mu$M (830 mmols/m$^3$) |
| CPC - 33 $\mu$M (33 mmols/m$^3$) |
| ADSORPTION OF SURFACTANT ON MINERAL ABOVE CMC: |
| ON 1-15 MICROMETER ALUMINA |
| SDS - 23.0 mmols/Kg |
| CPC - 0.35 mmols/Kg |
| ON 40 MICROMETER ALUMINA |
| SDS - 84.0 mmols/Kg |
| CPC - 0.56 mmols/Kg |

The results of experiment 1, a single column run, are reported in FIG. 4, and the experimental parameters in Table 2. The column porosity, based on a mass balance, was 82.1%, and the void volume (or pore volume, pv) was 1.28 ml. Eleven pore volumes of the standard brine were injected through the column before the beginning of the measurements shown in FIG. 4. Through-out injection of the brine preflush, a uniform flow rate of 0.092 ml/min was observed. One pore volume (1.28 ml) of SDS at its critical micelle concentration (800 moles/l or 230 parts per million) was injected into the column at the beginning of the period reported in the FIG. 4. This was followed by ½ pore volume of brine and ½ pore volume of CPC at 20 times its critical micelle concentration (640 moles/l or 220 ppm). The flow rate remained approximately constant until 80 minutes into the run (the slight increase in flow rate after two pore volumes appears to have been due to the need to shut off the pump in the original experimental set up when changing the injected solution); at this time the flow rate began an exponential decrease which continued until the run was terminated after three hours. During the progress of the run, channeling was observed to be occurring between the bed and the column wall at two points, one in the middle of the column and one nearer the end of the column. It would seem that these should be associated with regions of plug formation. From the injected concentrations and compositions surfactant precipitation would be expected. The overall flow rate declined 34%; permeability reduction was probably much greater, as it appeared that pressure built up until channeling between the bed and the wall was observed, which was not seen before surfactant injection had occurred. This would correspond to forcing the flowing fluids into the low permeability regions of a reservoir. Additionally, continued flushing with brine resulted in the disappearance of the channels, apparently through partial dissolution of the plugs. The flow rate, however, was not observed to substantially recover even after the apparent channeling disappeared.

TABLE 2

| SYSTEM PARAMETERS, EXPERIMENT 1 | |
|---|---|
| PREFLUSH - | 11.0 PORE VOLUMES (pv) |
| VOLUME OF SDS SLUG - | 1.00 pv |
| VOLUME OF BRINE SPACER - | 0.50 pv |
| VOLUME OF CPC SLUG - | 0.50 pv |
| VOLUME OF BRINE DRIVE - | 10.4 pv |
| COLUMN PORE VOLUME - | 1.28 cm$^3$ |
| STEADY STATE FLOW RATE AT END OF PREFLUSH - | 0.092 ml/min (1.53 × 10$^{-3}$ cm$^3$/s) |
| POROSITY OF SAND PACK - | 0.821 |
| SURFACTANT CONCENTRATIONS IN SLUGS: | |
| SDS - | 830 μM (830 mmol/m$^3$) |
| CPC - | 660 μM (660 mmol/m$^3$) |

Figure 5:
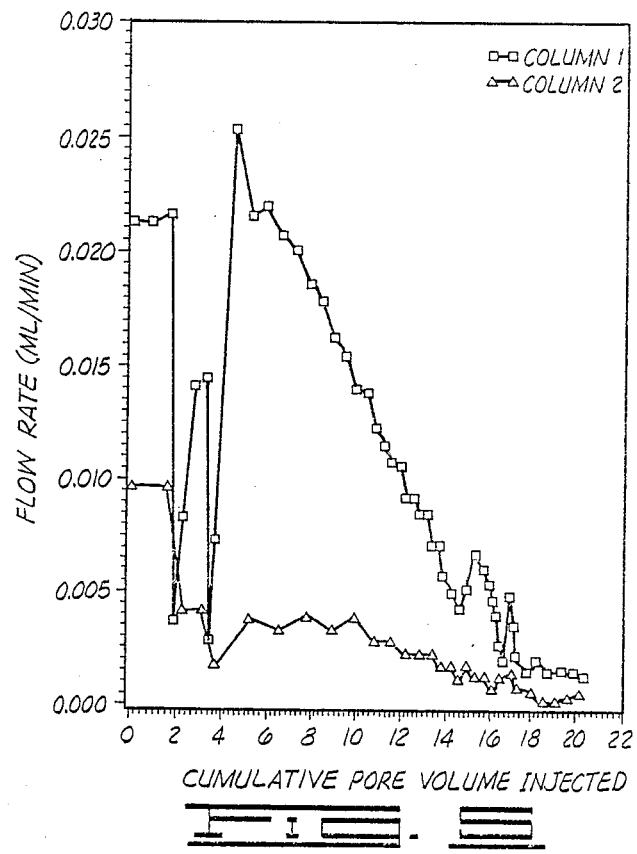
FIG. 5 is a graphic representation similar to FIG. 4, but plotting the results of another experiment.

The results of experiment 2, a parallel sand pack run, are shown in FIG. 5, which is a plot of the flow rate through each column versus the cumulative pore volumes injected, and the experimental parameters are summarized in Table 3. As in the proceding experiment, only results following the initial brine preflush are plotted in the figure. Initially, 69% of the flow was through column 1. As mentioned before, the fluctuation in flow rate during injection of surfactants and brine spacer appears to be due to slight differences in the pump setting following the switching of feeds. During injection of the brine drive after the last surfactant slug, the flow rate through column 1, the higher permeability column, started to decrease, falling to 0.001 ml/min after 17.3 pv had been injected. It remained almost constant at this value, which was below the flow rate through the low permeability column, column 2, until the end of the run. Up to 16 pv after injection of the CPC slug the percentage of the flow going through the high permeability column remained higher (between 60% and 90% of the overall flow through the parallel packs), but it then decreased, dropping to only 30% of the total flow during the last 4 pv before the run was terminated. It can be speculated from this that the precipitate was fully formed only after the time required for the 16 pv to be injected, and this resulted in final attainment of a stable flow condition. It should be recalled that in the static experiments, several weeks were often needed before any precipitate fully formed. The primary result of significance from this run is the demonstration of preferential or selective plugging, even though 30% of the flow was already going through the low permeability column before the process began.

TABLE 3

| SYSTEM PARAMETERS, EXPERIMENT 2 | | |
|---|---|---|
| PREFLUSH - | 1.7 PORE VOLUMES (pv) | |
| SDS SLUG VOLUME - | 0.38 pv | |
| CONCENTRATION - | 3320 mmol/m$^3$ | |
| BRINE SPACER VOLUME - | 1.25 pv | |
| CPC SLUG VOLUME - | 0.37 pv | |
| CONCENTRATION - | 3300 mmol/m$^3$ | |
| BRINE DRIVE VOLUME - | 16.5 pv | |
| | COLUMN 1 | COLUMN 2 |
| INITIAL FLOW RATE (cm$^3$/S) | 3.71 × 10$^{-4}$ | 1.61 × 10$^{-4}$ |
| PORE VOLUME (cm$^3$) | 0.86 | 0.79 |
| POROSITY | 0.81 | 0.74 |
| PERCENT OF TOTAL FLOW | | |
| INITIAL | 68.9 | 31.1 |
| FINAL | 50.8 | 49.2 |

Figure 6:
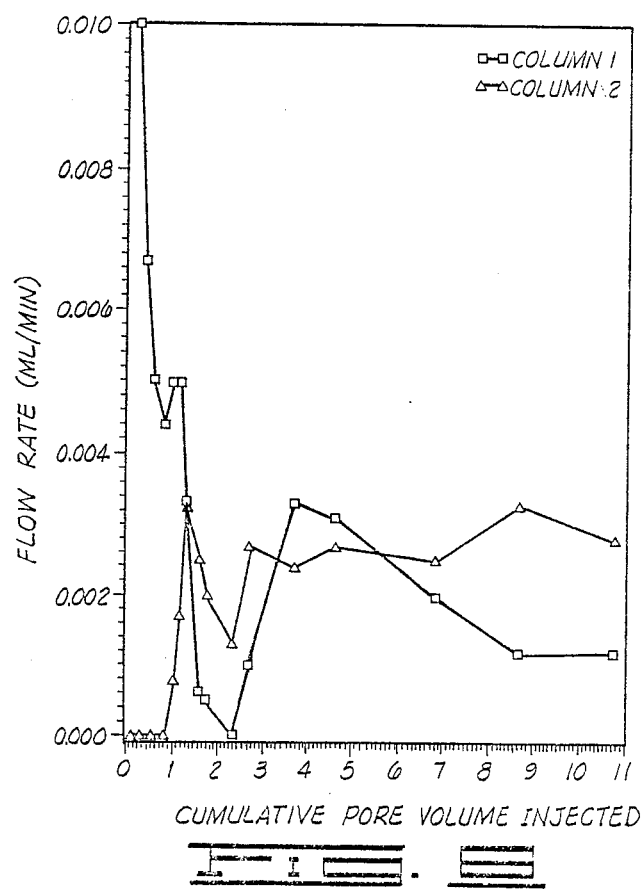
FIG. 6 is a graphic representation, similar to FIGS. 4 and 5, but plotting the results of yet another experiment.

A similar injection sequence was repeated with the two parallel sand packs in experiment 3, but now with both originally filled with n-heptane and then waterflooded, in parallel, so that both had the same pressure drop, until secondary production ceased. The results are plotted in FIG. 6 and the experimental parameters are shown in Table 4. The two different particle size powders of alpha-alumina were used so that the porosity and permeability of the two sand packs differed. The high and low permeability columns were saturated with n-heptane to 57% oil saturation and 82% oil saturation, respectively. During the waterflood, 42% of the oil initially in the high permeability column (18% of the oil initially in place, OIIP) was recovered. During this step all 100% of the flow was passing through column 1, so that no oil was recovered from column 2. The surfactant injection sequence resulted in complete blockage of the high permeability sand pack, so that 100% of the flow was diverted into the low permeability column, resulting in recovery of an additional 35% of the original oil in the low permeability column. Continued flushing with brine resulted in an increase in the flow rate through column 1. This was probably due to partial dissolution of the plugs. As is evident from FIG. 6, however, the flow rate through the high permeability column still did not substantially recover.

TABLE 4

| SYSTEM PARAMETERS, EXPERIMENT 3 | | |
|---|---|---|
| PREFLUSH - | 1.0 PORE VOLUMES (pv) | |
| SDS SLUG VOLUME - | 0.6 pv | |
| CONCENTRATION - | 24900 mmol/m$^3$ | |
| BRINE SPACER VOLUME - | 2.0 pv | |
| CPC SLUG VOLUME - | 0.6 pv | |
| CONCENTRATION - | 3300 mmol/m$^3$ | |
| BRINE DRIVE VOLUME - | 8.0 pv | |
| | COLUMN 1 | COLUMN 2 |
| PORE VOLUME (cm$^3$) | 0.833 | 0.783 |
| PERCENT OF TOTAL OIL RECOVERED: | | |
| FROM WATERFLOOD | 42% | 0% |
| BY SURFACTANT ENHANCED | 0% | 31% |

TABLE 4-continued
SYSTEM PARAMETERS, EXPERIMENT 3

VOLUMETRIC SWEEP
EFFICIENCY                                                    5

The following conclusions are suggested by the experimental results reported here:

1. By using the phase behavior and chromatographic movement of surfactants, formation of plugs in a porous medium can be achieved using very dilute solutions of surfactants.

2. The high permeability regions of a sand pack can be selectively plugged by in situ mixing of sequentially injected surfactants resulting in a surfactant phase separation.

3. An enhanced oil recovery by surfactant enhanced volumetric sweep efficiency after normal water flooding can be achieved in sand packs of significant permeability variation.

What is claimed is:

1. A method for selectively plugging the more permeable regions of an underground formation having non-uniform permeability, comprising:

injecting into the formation a first surfactant solution in an amount effective to contact a substantial portion of the surface area of the highly permeable regions of the formation, which first surfactant solution is characterized as having a selected chromatographic velocity and as being capable of reversibly adsorbing onto the surface of the pores of the formation;

after injecting the first surfactant solution, a water-soluble spacer fluid in an amount sufficient to place the first surfactant solution a selected distant into the formation, the spacer fluid being characterized as having a pre-injection viscosity about equal to the first surfactant solution; and after injecting the space fluid, a second surfactant solution in an amount about equal to the amount of the first surfactant solution, and characterized as having a pre-injection viscosity about equal to the first surfactant solution and the spacer fluid, and as having a selected chromatographic velocity which is higher than the chromatographic velocity of the first surfactant solution, and as having a composition such that it will be capable of interacting physically with the first surfactant solution to produce a phase change so that the product of such interaction is capable of at least partially plugging the pores of the formation in which such product is placed.

* * * * *